United States Patent [19]
Zicker

[11] Patent Number: 5,937,344
[45] Date of Patent: Aug. 10, 1999

[54] CALL-BACK METHOD IN RESPONSE TO EMERGENCY CALL ORIGINATING FROM CELLULAR RADIOTELEPHONE

[75] Inventor: Robert G. Zicker, Roswell, Ga.

[73] Assignee: GTE Mobilnet Service Corporation, Atlanta, Ga.

[21] Appl. No.: 09/175,639

[22] Filed: Oct. 20, 1998

Related U.S. Application Data

[63] Continuation of application No. 08/799,906, Feb. 13, 1997.

[51] Int. Cl.⁶ .............................. H04Q 7/00; H03M 11/00
[52] U.S. Cl. ............................................ 455/404; 455/433
[58] Field of Search ................................. 455/404, 408, 455/432–433, 458–460; 379/37, 45

[56] References Cited

U.S. PATENT DOCUMENTS

| | | | |
|---|---|---|---|
| 4,926,496 | 5/1990 | Cole et al. ............................... | 455/404 |
| 5,365,570 | 11/1994 | Boubelik ................................. | 455/433 |
| 5,465,388 | 11/1995 | Zicker ..................................... | 455/404 |
| 5,497,412 | 3/1996 | Lannen et al. ........................... | 455/408 |
| 5,563,931 | 10/1996 | Bishop et al. ........................... | 455/404 |
| 5,689,548 | 11/1997 | Maupin et al. ........................... | 455/404 |
| 5,712,900 | 1/1998 | Maupin et al. ........................... | 455/433 |

*Primary Examiner*—Salvatore Cangialosi
*Attorney, Agent, or Firm*—Leonard Charles Suchyta; Floyd E. Anderson

[57] ABSTRACT

An emergency call originates from a cellular radiotelephone (20) and communicates through one of A-side and B-side cellular systems. Upon receipt of the call, the cellular radiotelephone (20) is assigned a temporary substitute Mobile Identification Number (MIN) (100) by the receiving A-side or B-side cellular system MTSO (33). Upon termination of the emergency call, a call-back to the cellular radiotelephone (20) is routed to both of the A-side and B-side MTSOs (100), using the substitute MIN (100), by the Public Switched Telecommunications Network (36). Both A-side and B-side MTSOs (100) issue a page order message to cellular radiotelephone (20) by transmitting to the MIN (74). Paging order confirmation messages (78), conveying the MIN (74), are evaluated for a match with a unique Electronic Serial Number (76).

16 Claims, 5 Drawing Sheets

CALL-BACK METHOD IN RESPONSE TO EMERGENCY CALL ORIGINATING FROM CELLULAR RADIOTELEPHONE

RELATED INVENTION

The present invention is a continuation of "Call-back Method in Response to Emergency Call Originating From Cellular Radiotelephone," U.S. patent application Ser. No. 08/799,906, filed Feb. 13, 1997 which is incorporated by reference herein.

TECHNICAL FIELD OF THE INVENTION

The present invention relates generally to cellular radiotelephones. More specifically, the present invention relates to a cellular radiotelephone connection with a Public Safety Answering Position (PSAP).

BACKGROUND OF THE INVENTION

Cellular radiotelephones have become increasingly popular for many different reasons, including their potential usage in case of emergency. Cellular radiotelephones adequately meet the needs of emergency situations because they can be carried with a user to be readily available whenever and wherever needed. However, cellular radiotelephones have a distinct disadvantage from conventional landline telephones in that they may not provide sufficient information in which to reliably perform a return call.

When an emergency call is placed from a cellular radiotelephone, the call is routed to a public safety answering position (PSAP). If the two parties are unexpectedly disconnected or if the call has terminated but additional information is needed, a "call-back" may be desired. A call-back is a return call made by the PSAP directed to the cellular radiotelephone from which the emergency call originates.

In accordance with conventional methodologies, when the cellular radiotelephone is a subscriber within it's own service area, a call-back is a local call to the radiotelephone Mobile Identity Number (MIN) for the cellular radiotelephone making the original emergency call. Likewise, the subscriber can be a roamer who has activated a "call follow" service. In conventional systems, a call follow service assigns a temporary local phone number to the roaming cellular radiotelephone and sends a call forward order to the roamer's service area. When an emergency call is placed by the roaming cellular radiotelephone, the PSAP receives the local phone number as the number from where the emergency call originated. During call-back, the PSAP directs the call to the local phone number. The roaming area MTSO receives the call-back to the local phone number and translates the temporary local phone number into the roaming cellular radiotelephone's MIN. The call-back is then directed to the roaming cellular radiotelephone.

If an emergency call is originated by a subscriber who is roaming and has not activated a call follow service, the PSAP will receive a MIN that is invalid in the roamer's current service area. In accordance with conventional methodologies, a call-back will fail because a call-back to an invalid MIN will not be placed through a MTSO.

In these situations, a call-back is not necessarily successful. A further complication arises if the cellular radiotelephone switches to the non-preferred A-side or B-side system after the emergency call but prior to the attempted call-back. This can occur if the cellular radiotelephone moves in an area were the signal strength of the non-preferred system is significantly greater than that of the preferred system, or if the preferred system becomes unavailable. In accordance with conventional methodologies, call-backs are directed through the preferred A-side or B-side system for that cellular radiotelephone, hence the call-back will fail because the cellular radiotelephone is no longer monitoring that cellular system.

If a call-back is not received by the cellular radiotelephone, the PSAP could possibly attempt the call-back over the other one of the local A-side or B-side systems to ameliorate the situation where the cellular radiotelephone switches systems. In accordance with current methodologies, call-back attempts over both A-side and B-side MTSOs would be performed sequentially thereby costing valuable time. Moreover, if the caller is roaming and the caller's home service area has no roaming agreement with either system in a roaming area, the call-back attempt will still fail.

Additional problems arise with "unauthorized" cellular radiotelephones. Unauthorized cellular radiotelephones are those cellular radiotelephones that do not have a valid, unique MIN. While normal calls cannot originate from an unauthorized cellular radiotelephone, emergency calls are an exception. Emergency calls are routed to the PSAP without confirming the validity of the cellular radiotelephone to be using the system. However, current methodologies do not allow for call-backs to be successfully made to these unauthorized cellular radiotelephones. Unauthorized cellular radiotelephones include "non-subscribers" and "inactive" cellular radiotelephones.

A non-subscriber is a cellular radiotelephone that was once a subscriber with an assigned MIN, but is no longer a paying customer. The MIN may remain programmed in the cellular radiotelephone, however it is invalid because the MIN is no longer assigned to that cellular radiotelephone by the home service area MTSO. A normal call can only be connected if the MIN and the radiotelephone Electronic Serial Number (ESN) match the assigned MIN/ESN, as reported by the home service area MTSO. Unless both numbers match, the home service area for that MIN will not steer the call to this unauthorized cellular radiotelephone.

An inactive cellular radiotelephone has never been a subscriber to a cellular service, therefore it may not have a unique MIN. A call-back cannot be performed because this cellular radiotelephone has no dialable telephone number.

Given these examples, if an emergency call originating from a cellular radiotelephone is disconnected, conventional Mobile Telephone Switching Offices (MTSOs) may be unable to set up a call-back from the PSAP to the cellular radiotelephone. This inability to return a call is a serious problem in an emergency situation.

SUMMARY OF THE INVENTION

Accordingly, it is an advantage of the present invention to provide an improved method of call-back following an emergency call from a cellular radiotelephone.

Another advantage of this invention is to provide this call-back method for subscribers of cellular radiotelephones outside of their service areas and users of cellular radiotelephones that are not subscribers to a cellular service.

Another advantage of this invention is to provide this call-back method concurrently through both A-side and B-side cellular systems to increase the probability of a rapid and successful call-back.

Another advantage of this invention is to implement this process without requiring changes to existing cellular radiotelephones.

The above and other advantages of the present invention are carried out by a method in which an MTSO can provide call-back to a cellular radiotelephone following an emergency call. The method calls for detecting an emergency call from a cellular radiotelephone to a PSAP and assigning the radiotelephone a substitute MIN. The MTSO then enables the call. Following termination of the call, the MTSO detects a call-back to the substitute MIN. The MTSO then pages the cellular radiotelephone assigned that substitute MIN.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
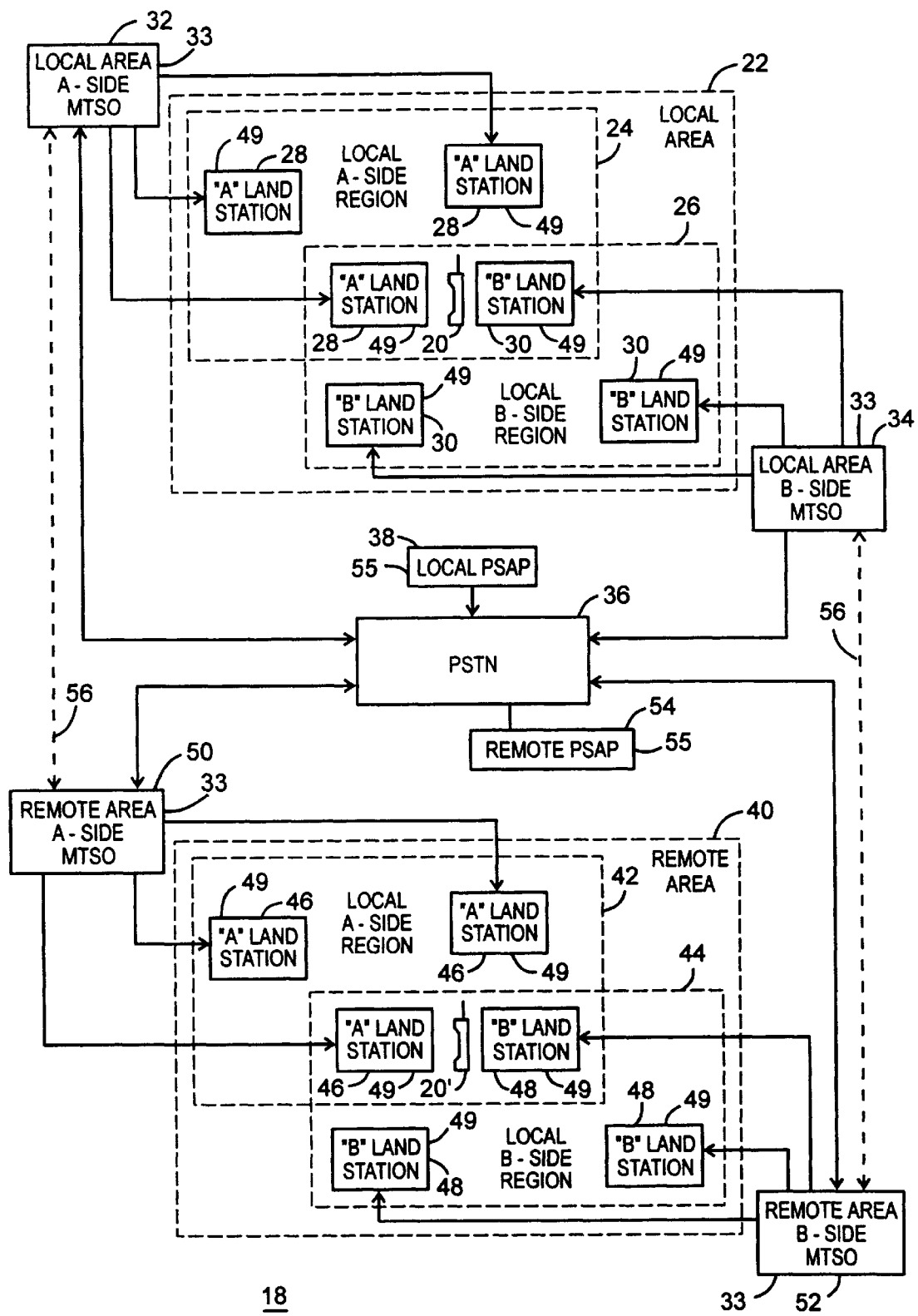
FIG. 1 shows a layout diagram of environments within which an emergency call from a cellular radiotelephone may originate.

FIG. 1 shows a layout diagram of a cellular system environment 18 within which an emergency call from a cellular radiotelephone 20 may originate. In cellular system environment 18, the same cellular radiotelephone 20 is depicted at two different points in time in two different areas (discussed below). Although FIG. 1 shows a single cellular radiotelephone 20, any number of cellular radiotelephones 20 may operate in this and other similar environments. Cellular radiotelephone 20 can be configured as a conventional portable unit which is easily carried from place to place, thus able to freely move about within environment 18.

A local area 22 contains both local A-side region 24 and local B-side region 26 for cellular radiotelephone 20. Local A-side region 24 and local B-side region 26 are supported by a plurality of "A" land stations 28 and "B" land stations 30. "A" land stations 28 and "B" land stations 30 cover diverse cells or areas of geography. Local A-side region 24 and local B-side region 26 may, and typically do, cover the same geographical areas and have a plurality of land stations 49.

The overlapping of local A-side region 24 and local B-side region 26 results from FCC rules which are intended to encourage competition in the provision of cellular radiotelephone services. No interference between communication taking place in overlapping cells occurs because A-side cellular systems operate only on one set of frequencies, or channels, assigned by the FCC, and B-side cellular systems operate only on an entirely different set of channels.

FIG. 1 illustrates only a minor overlap between local A-side region 24 and local B-side region 26 for clarity of illustration. However, those skilled in the art will appreciate that extensive overlap exists in most metropolitan areas. While extensive overlap between A-side and B-side cellular systems typically exists, nothing in the present invention requires any overlap to be present, and A-side and B-side cellular systems may both fail to cover some areas.

In FIG. 1, "A" land stations 28 and "B" land stations 30 are connected to local A-side and B-side system mobile telephone switching offices (MTSOs), 32 and 34 respectively, via conventional land lines or microwave links. In turn, local A-side and B-side MTSOs 32 and 34 connect to the public switched telephone network (PSTN) 36. Additionally a local public safety answering position (PSAP) 38 is linked to PSTN 36 via conventional landlines. MTSOs 33 in cellular system environment 18, which include local A-side and B-side MTSOs 32 and 34 respectively, control and supervise the connection of cellular radiotelephone 20 to public switched telephone network (PSTN) 36.

Typically, service to A-side cellular region 24 is provided by an entirely separate organization from that which provides B-side cellular region 26. In accordance with conventional advanced mobile phone services (AMPS) cellular telephony methodology, cellular radiotelephones are subscribers to one of the A-side and B-side systems. These radiotelephones are programmed to prefer engaging in communications with the specific home system and system type (either A or B) to which they subscribe.

Figure 2:
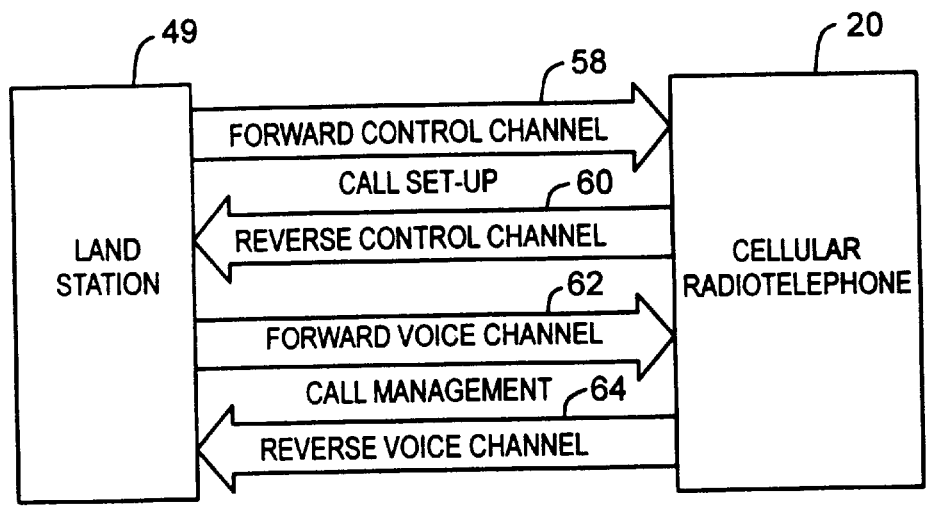
FIG. 2 shows a diagram of communication channels between a land station and a cellular radiotelephone.

FIG. 2 illustrates four signaling paths used in the preferred embodiment for communication between land stations 49 and cellular radiotelephone 20. A forward control channel 58 and a reverse control channel 60 are used to set up calls and manage cellular radiotelephones 20 on a cellular system. A forward voice channel 62 and a reverse voice channel 64 are used to communicate voice and other user-provided information for managing the calls. Data is transmitted on these voice channels before, after, and during a call.

Figure 3:
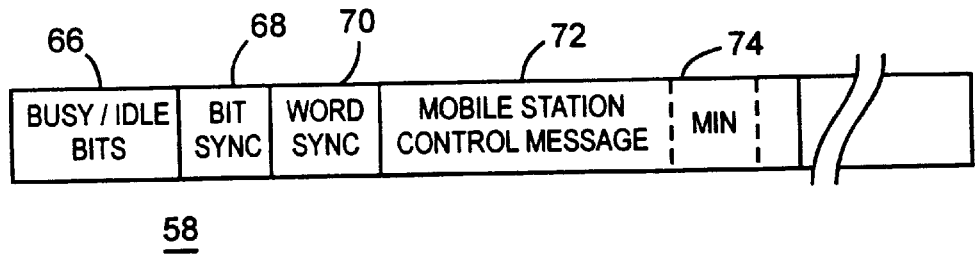
FIG. 3 shows a data format diagram depicting a portion of data transmitted over a forward control channel.

FIG. 3 shows a data format diagram depicting a portion of data transmitted over forward control channel 58. Forward control channel 58 is used by land station 49 (FIG. 1) to convey information from MTSO 33 (FIG. 1) to cellular radiotelephone 20. In response to orders sent from MTSOs 33 (FIG. 1), land stations 49 send a continuous stream of broadcast data over forward control channel 58. This broadcast data typically includes busy/idle bits 66, a bit sync 68, and a word synch 70. Each frame of the data stream over forward control channel 58, contains bit sync 68 and word sync 70 to enable cellular radiotelephone 20 to obtain synchronization. In accordance with conventional AMPS cellular telephony practice, busy/idle bits 66 are sent at the beginning of every bit sync sequence, word sync sequence, first repeat of a word and every ten message bits thereafter to indicate the current busy/idle status of the corresponding reverse control channel 60 (FIG. 2). Information is sent in forty bit words and can take the form of a mobile station control message 72.

Mobile station control message 72 is sent to tell cellular radiotelephone 20 what is required of it. The message contains a mobile identification number (MIN) (discussed below) of cellular radiotelephone 20.

Figure 4:
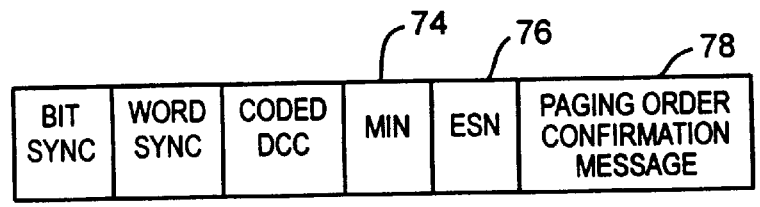
FIG. 4 shows a data format diagram depicting a portion of data transmitted over a reverse control channel.

FIG. 4 shows a data format diagram depicting a portion of data transmitted over reverse control channel 60. Reverse control channel 60 is used by cellular radiotelephone 20 to convey data to land station 49 and MTSO 33 (FIG. 1). If cellular radiotelephone 20 is performing a registration, cellular radiotelephone 20 sends three words containing a radiotelephone MIN, a radiotelephone electronic serial number (ESN), and other data. If an emergency call or other call is initiated by cellular radiotelephone 20, then an additional two to four words are sent with the requested number.

An activated cellular radiotelephone 20, is programmed with a unique mobile identification number (MIN) 74. MIN 74 is a 34 bit binary number derived from a ten digit telephone number. An inactive cellular radiotelephone 20 is typically programmed from the manufacturer with a null MIN 74. The ten digits of null MIN 74 are typically all zeroes, thus making MIN 74 non-unique with respect to other inactive cellular radiotelephones.

Cellular radiotelephone 20 also has an electronic serial number (ESN) 76 which is a unique number given to cellular radiotelephone 20 during manufacture. ESN 76 is permanent and usually not reprogrammable, while MIN 74 is semi-permanent and may be reprogrammed as needed. During activation, cellular radiotelephone 20 is programmed with MIN 74, system identification for preferred local A-side region 24 or local B-side region 26, and other parameters. Cellular radiotelephone 20 will use this information and the permanently programmed ESN 76 to gain access on a preferred A-side or B-side system.

When calls are initiated at cellular radiotelephone 20, the number to be called is typically loaded via the keypad. Cellular radiotelephone 20 checks forward control channel 58 and monitors busy/idle bits 66. When busy/idle bits 66 are idle, cellular radiotelephone 20 performs a system access. System access is accomplished by sending data over reverse control channel 60 for processing. This data contains MIN 74, ESN 76 and the called number. For normal calls (i.e. non-emergency calls), processing includes confirming that MIN 74 and ESN 76 are valid on the system. When confirmed, land station 49 sends mobile station control message 72 (FIG. 3) to allocate forward and reverse voice channels 62 and 64 (FIG. 2) and at the same time sets up the call on forward voice channel 62. Cellular radiotelephone 20 checks the data and stores it in memory, then moves to reverse voice channel 64 in order to open a conversation path.

At each given period of time in which cellular radiotelephone 20 is in an idle mode, it monitors a forward control channel 58 used by either an A-side or B-side cellular system for an incoming call. When an incoming call is being directed to cellular radiotelephone 20 through MTSO 33 (FIG. 1), mobile station control message 72 is transmitted over forward control channel 58 to page cellular radiotelephone 20. Cellular radiotelephone 20 monitors busy/idle bits 66 on forward control channel 58 and when reverse control channel 60 is free, performs a system access. System access is accomplished by sending data over reverse control channel 60. These data include MIN 74, ESN 76, and a paging order confirmation message 78. In response to paging order confirmation message 78, busy/idle bits 66 are changed to busy and data is transferred to MTSO 33 to confirm MIN 74 and ESN 76 validity on the cellular system. When confirmed, land station 49 sends mobile station control message 72, over forward control channel 58, to allocate a voice channel for the conversation. Cellular radiotelephone 20 checks the data and stores it in memory, then returns to reverse voice channel 64 to confirm channel set up. Land station 49 sends an alert order from MTSO 33 to cellular radiotelephone 20 over forward voice channel 62. Cellular radiotelephone 20 responds by sending a signal confirming activation of an alerting signal over reverse voice channel 64. When the call is answered, a signaling tone is removed and a conversation path is opened.

For calls directed to the 911 emergency number (i.e. an emergency call) MIN 74 and ESN 76 are not confirmed for validity on the system, however the emergency call directed to PSAP 55 will be enabled. Hence, in the case of a desired call-back, cellular radiotelephone 20 could be in any one of several possible modes of operation.

Referring back to FIG. 1, cellular radiotelephone 20 is located in local area 22, and could be operating in one of several modes. Cellular radiotelephone 20 could be a subscriber with a MIN 74 (FIG. 3) for local area 22. In another mode, cellular radiotelephone 20 could be a non-subscriber with an invalid MIN 74 for local area 22. In a different mode, an emergency call could be originating from an inactive cellular radiotelephone 20 with a null MIN 74. While conventional MIN/ESN confirmation processes might otherwise prevent a call-back to cellular radiotelephone 20 from succeeding in these modes, a call-back process (discussed below) insures a successful call-back.

At another point in time, cellular radiotelephone 20, as denoted by cellular radiotelephone 20', has moved outside of local area 22 and is a roamer in a remote area 40.

Remote area 40 is also covered by both A-side and B-side cellular systems having coverage regions 42 and 44, respectively. This coverage is supported by a plurality of "A" land stations 46 for remote A-side region 42 and a plurality of "B" land stations 48 for remote B-side region 44. "A" land stations 46 and "B" land stations 48 are connected to remote A-side and B-side system MTSOs 50 and 52, respectively. Remote A-side system and B-side system MTSOs 50 and 52 then link to public switched telephone network (PSTN) 36 via landlines or microwave links. Likewise a remote public safety answering position (PSAP) 54 is linked to PSTN 36 via landlines.

As a subscriber in local area 22, cellular radiotelephone 20' may have activated a call follow service. The call follow service results in assignment of a local temporary phone number to cellular radiotelephone 20, and all calls to cellular radiotelephone 20', being forwarded via a call follow communication link 56 to remote A-side or B-side system MTSO, 50 or 52. Call follow communication link 56 is a landline that allows communication between MTSOs 33. Conventional processes direct call-backs from remote PSAP 54 to cellular radiotelephone 20' via a number that is local for remote area 40.

When a PSAP 55, whether local PSAP 38 or remote PSAP 54, receives an emergency call through PSTN 36, the calling party number is supplied to PSAP 55. This calling party number can then be used to make a call-back. If the cellular radiotelephone's call follow service has not been activated, call follow communication link 56 is not present and remote PSAP 54 receives the MIN 74 (FIG. 2) as the calling party number. MIN 74 is not a local number with respect to remote area 40 and is considered invalid. While in conventional call-back processes an invalid MIN would prevent a call-back from succeeding, a call-back process (discussed below) insures a successful call-back.

Figure 5:
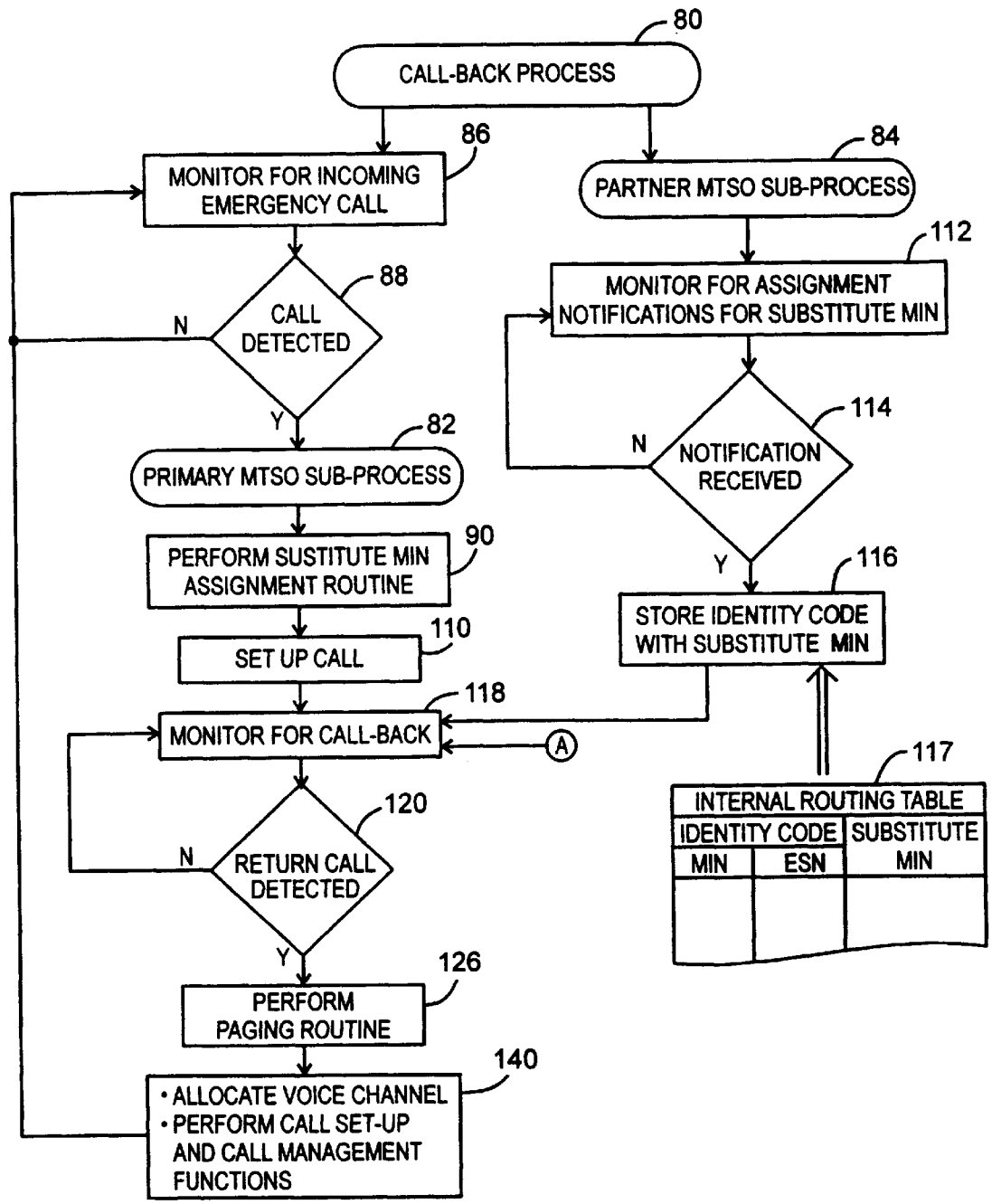
FIG. 5 shows a flow chart of a call-back process performed by both A-side and B-side MTSOs in response to emergency call from a cellular radiotelephone.

FIG. 5 shows a flowchart of a call-back process 80 for operating a cellular radio telecommunication network having an A-side system MTSO, 32 or 50 (FIG. 1), and a B-side system MTSO, 34 or 52. Call-back process 80 provides an improved method for enabling a return call to cellular radiotelephone 20 (FIG. 1) following an emergency call. Call-back process 80 occurs in either or both of a subscriber's local area 22 (FIG. 1) or remote area 40.

Each MTSO 33 performing call-back process 80 performs a task 86. Task 86 monitors for incoming emergency calls. Those skilled in the art realize that task 86 can occur in conjunction with other MTSO 33 activities which are not relevant to the present invention. For example, MTSO 33 may evaluate each call received from cellular radiotelephones to determine if the call is an emergency call. MTSO 33 will continue to monitor for incoming emergency calls in conjunction with other parallel functions.

In conjunction with task 86, a query task 88 determines if an emergency call from cellular radiotelephone 20 is detected. If no emergency call initiated by cellular radiotelephone 20 is detected, program control returns to task 86 to continue monitoring for incoming emergency calls.

At query task 88, when an emergency call is detected from cellular radiotelephone 20, the MTSO 33 receiving the emergency call becomes a primary MTSO 33, and the other MTSO 33 of the A-side and B-side cellular system becomes a partner MTSO 33. Primary MTSO 33 launches into primary MTSO sub-process 82. For the purposes of this description, a primary MTSO is defined to be an MTSO 33 within either the local area 22 or remote area 40 in which an emergency call from cellular radiotelephone 20 is first detected. A partner MTSO is defined to be the other MTSO 33 of the A-side and B-side cellular systems within either the local area 22 or remote area 40 in which the emergency call takes place. Primary MTSO sub-process 82 includes those tasks performed by the primary MTSO, while partner MTSO sub-process 84 includes those tasks performed by the partner MTSO when an emergency call is received by the primary MTSO.

Primary MTSO sub-process 82 begins with a task 90 which performs a substitute mobile identification number (MIN) assignment routine.

Figure 6:
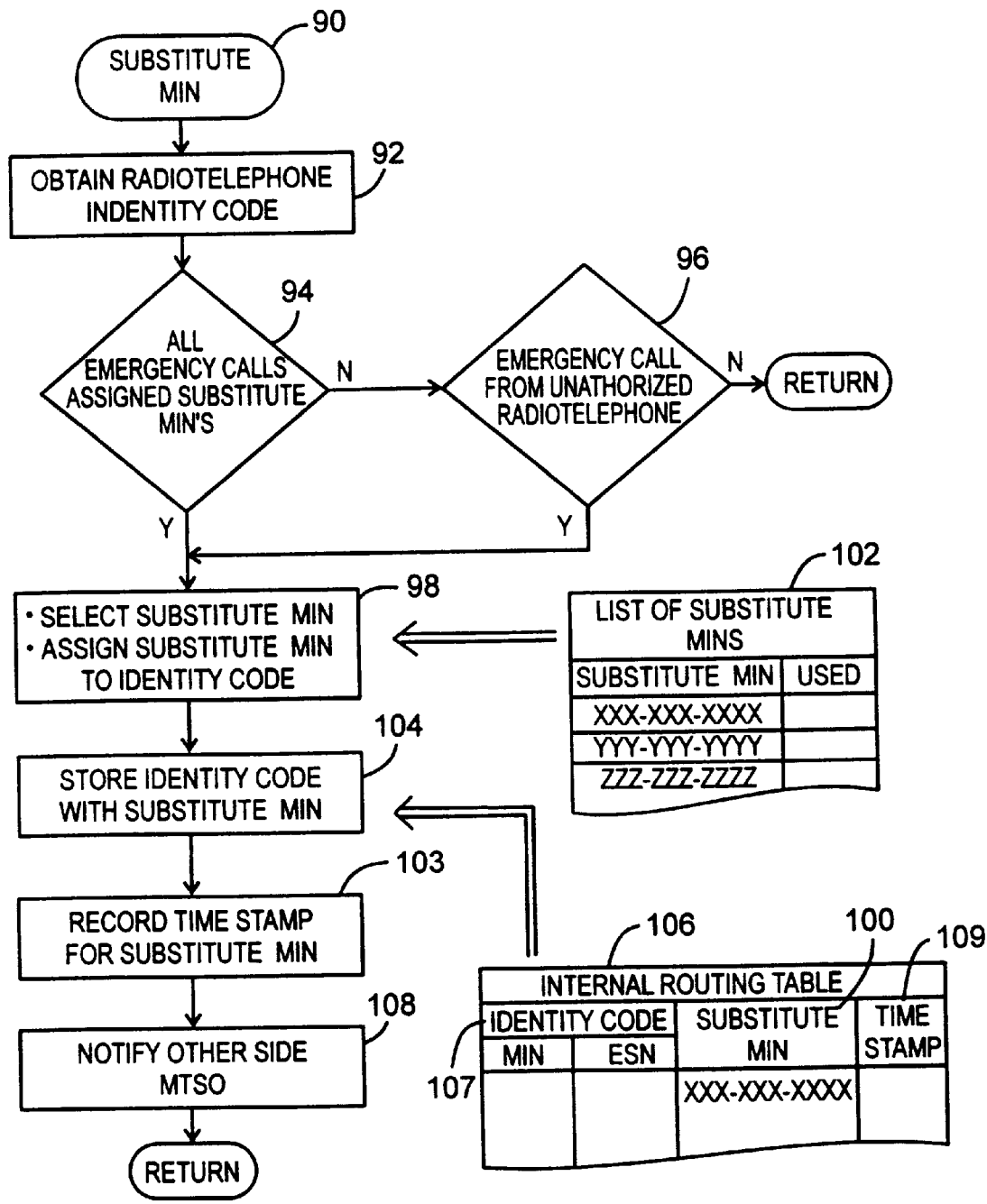
FIG. 6 shows a flow chart of a substitute Mobile Identification Number (MIN) assignment routine performed by the MTSO that is receiving the incoming emergency call.

FIG. 6 shows a flow chart of substitute MIN routine 90, which is performed by primary MTSO 33. A task 92 obtains an identity code for cellular radiotelephone 20 over reverse control channel 60 (FIG. 2). The identity code includes both MIN 74 and ESN 76 (FIG. 4) for cellular radiotelephone 20.

Next, an optional query task 94 determines if all cellular radiotelephones 20 placing emergency calls are to be assigned substitute MINs. Substitute MIN assignment is performed so that detected call-backs are directed towards that substitute MIN. In a first embodiment of call-back process 80, all emergency calls are assigned substitute MINs. This first embodiment is a preferred embodiment because it achieves a highly reliable call-back method, but at a cost of a large quantity of substitute MINs that are required.

Following optional task 94, if all emergency calls will not be assigned a substitute MIN, an optional query task 96 determines if cellular radiotelephone 20 is an "unauthorized" radiotelephone. An unauthorized radiotelephone is one in which cellular radiotelephone 20 has an invalid or a non-unique MIN 74, as discussed previously. At optional query task 96, if the emergency call is not from an unauthorized cellular radiotelephone 20, program control returns to FIG. 5 to set up the emergency call. Thus, in a second preferred embodiment of call-back process 80, only emergency calls originating from unauthorized cellular radiotelephones receive substitute MINs. In this second embodiment of call-back process 80, successful call-backs are likely regardless of which operational mode cellular radiotelephone 20 may be in. However, there is a minor reduction of reliability in successfully making a call-back compared to the first embodiment. The reduction in reliability occurs in cases where authorized cellular radiotelephones 20 switch systems and begin monitoring the partner A-side or B-side system between an emergency call and a corresponding call-back. In this situation a call-back directed through the primary MTSO 33 may not be received by cellular radiotelephone 20. However, this second embodiment is a preferred embodiment because the minor decrease in reliability has the benefit of decreasing the number of required substitute MINs, thus reducing costs.

Tasks 94 and 96 are considered optional tasks and are provided in FIG. 5 to differentiate between the first and second embodiments of the present invention. In actuality, either of the above-discussed first and second embodiments can be programmed into MTSO 33 prior to the emergency call. In the first embodiment of call-back process 80, all emergency calls are assigned substitute MINs, therefore tasks 94 and 96 are not relevant. In the second embodiment of call-back process 80, only emergency calls originating from unauthorized cellular radiotelephones receive substitute MINs, therefore task 96 is required to determine which cellular radiotelephones will be receiving substitute MINs.

In routine 90, when either query tasks 94 or 96 are affirmative, program control proceeds to a task 98. Task 98 selects an unused substitute MIN 100 from a list of substitute MINs 102. Primary MTSO 33 then assigns the selected substitute MIN 100 to cellular radiotelephone 20, and marks substitute MIN 100 as being used on list of substitute MINs 102.

Substitute MIN 100 is defined as a ten digit dialable North American Numbering Plan (NANP) telephone number which is a desirably local number relative to primary and partner MTSOs 33. List of substitute MINs 102 is accessible by both A-side and B-side system MTSOs 33. The substitute MINs 100 in list of substitute MINs 102 are assigned by a central office (not shown) for PSTN 36 (FIG. 1) and configured such that when a call-back to substitute MIN 100 is performed by PSAP 55 (FIG. 1), PSTN 36 initiates a conventional multiple routing or ring process. The multiple routing process concurrently routes the call-back to both primary and partner MTSOs 33. Thus, the call-back will be received concurrently by both primary and partner MTSOs 33 for initial processing through both systems. As part of the conventional multiple routing process, the central office for PSTN 36 will establish a connection through the first MTSO 33 that sends back an answer signal. The answer signal indicates that cellular radiotelephone 20 has answered the call-back through the first MTSO 33. In response to the connection, PSTN 36 will then drop the call to the second MTSO 33.

Following task 98, a task 104 stores a data element 107 which describes the identity code obtained from cellular radiotelephone 20, hereinafter referred to as identity code 107. Identity code 107 is stored in association with substitute MIN 100 in an internal routing table 106, managed by primary MTSO 33. In the preferred embodiments, identity code 107 includes at least a MIN and ESN for cellular radiotelephone 20. At any instant, internal routing table 106 may store any number of such associations for any number of substitute MINs 100.

Next a task 103 records a current time stamp 109 for determining an assignment duration of substitute MIN 100. Time stamp 109 is recorded in association with substitute MIN 100 in internal routing table 106.

Following task 103, a task 108 notifies the partner MTSO of the substitute MIN 100 assignment and associated identity code 107 for cellular radiotelephone 20. This communication takes place so that a call-back may be routed concurrently by PSTN 36 through the A-side and B-side system MTSOs 33 to cellular radiotelephone 20. After task 108, program control returns to a task 110, shown in FIG. 5.

With reference back to FIG. 5, a task 110 participates in setting up the emergency call through primary MTSO 33 to PSAP 55 (FIG. 1). Enabling the emergency call from cellular radiotelephone 20 to PSAP 55 occurs via PSTN 36. The responding PSAP 55 is informed that the emergency call originates from substitute MIN 100 when tasks 92, 98, 104, 103, and 108 were performed (FIG. 6). The emergency call proceeds normally through termination of the call.

In response to task 108 (FIG. 6), partner MTSO 33 performs partner MTSO sub-process 84 (FIG. 5). Within sub-process 84, a task 112 monitors assignment notifications for substitute MIN 100. Those skilled in the art will appreciate that task 112 occurs in conjunction with other MTSO 33 functions (not shown) that are not relevant to the present invention.

In conjunction with task 112, a query task 114 determines if assignment notification is received by partner MTSO 33 from primary MTSO 33. It is upon notification of the substitute MIN assignment, that MTSO 33 becomes recognized as a "partner" relative to an emergency call. The MTSO 33 that is a "partner" on one emergency call may be a "primary" on another emergency call. Assignment notification includes communication of identity code 107 and substitute MIN 100. If assignment notification is not received, program control loops to task 112 to monitor for assignment notifications.

If an assignment notification is received, a task 116 stores identity code 107 for cellular radiotelephone 20 from the assignment notification. Identity code 107 is stored in association with substitute MIN 100 in an internal routing table 117 managed by partner MTSO 33. Routing table 117 is equivalent to routing table 106 (FIG. 6) for primary MTSO 33.

Program control for primary and partner modes of operating MTSOs 33 proceeds from tasks 110 and 116, respectively, to a task 118. Task 118 monitors for a call-back directed to cellular radiotelephone 20 and is performed by both primary and partner MTSOs 33 in conjunction with other functions.

Next a query task 120, and subsequent tasks, are performed by both primary and partner MTSOs 33. Query task 120 detects call-backs directed to cellular radiotelephone 20. When no return call is detected, program control loops back to task 118 and monitors for call-backs directed to cellular radiotelephone 20.

In connection with tasks 118 and 120, a background timing process (not shown) monitors time stamp 109 (FIG. 6) and drops the association between substitute MIN 100 and identity code 107 when a timing window expires. After substitute MIN 100 is dropped, it is marked as available in list of substitute MINs 102 (FIG. 6) and can be assigned to a subsequent emergency call.

At query task 120, if a call-back is detected, process 80 proceeds to a paging routine 126. Paging routine 126 is performed by both primary MTSO 33 and partner MTSO 33. Paging routine 126 is performed substantially concurrently by primary and partner MTSOs 33 with respect to call-backs directed to substitute MINs.

Figure 7:
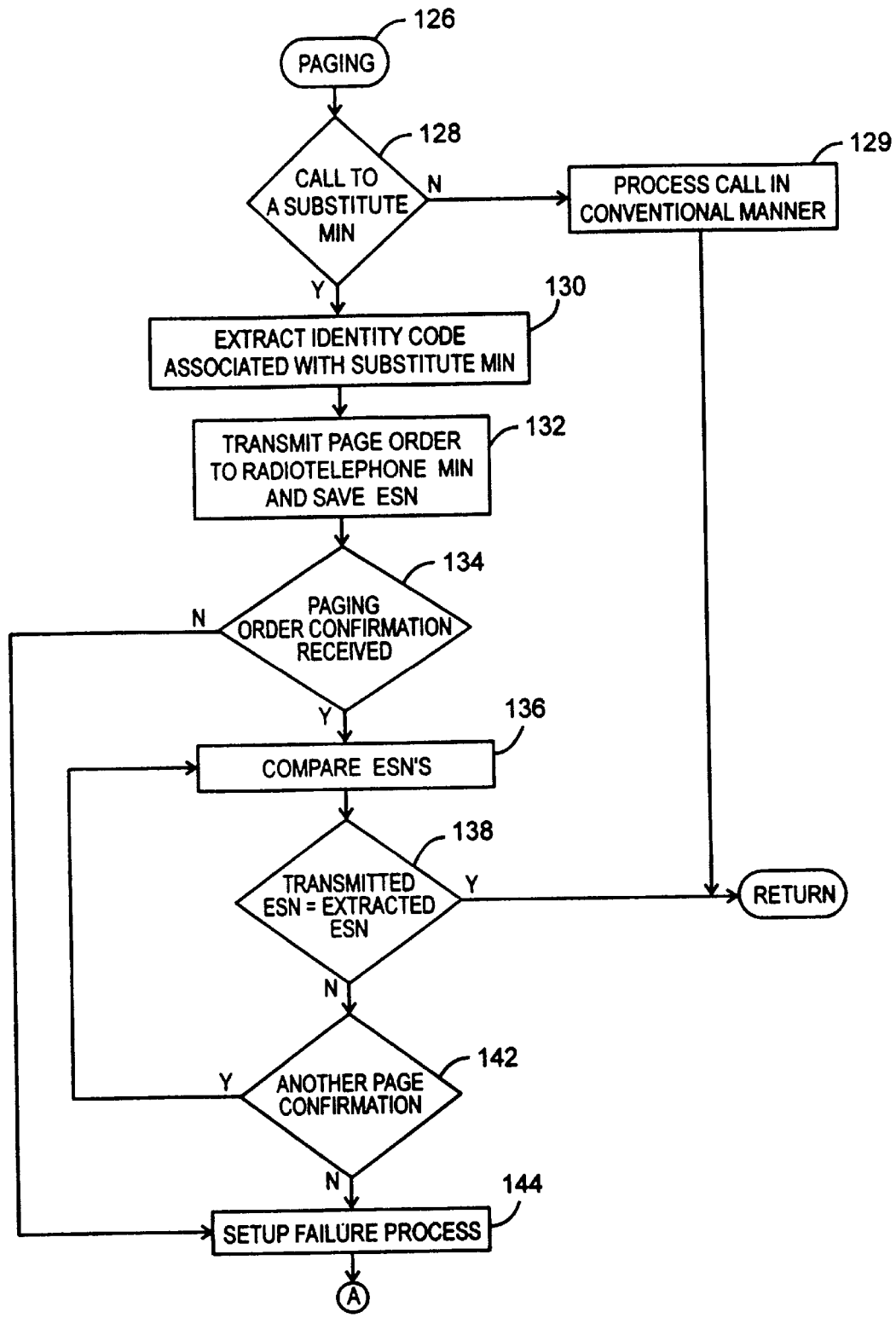
FIG. 7 shows a flow chart of a paging routine performed by both A-side and B-side MTSOs.

FIG. 7 shows a flow chart of a paging routine performed by both primary and partner MTSOs 33. With reference to paging routine 126, a query task 128 determines if the detected call-back is directed to a substitute MIN 100.

When the call-back is not directed to a substitute MIN 100, a task 129 processes the call in a conventional manner, and program control returns to a task 140 in process 80 (FIG. 5) to allocate a voice channel.

When the call-back is directed to a substitute MIN 100, a task 130 then extracts MIN 74 and ESN 76 from internal routing table 106 (FIG. 4), or internal routing table 117 (FIG. 3).

After task 130, a task 132 transmits a message addressed to MIN 74 and saves ESN 76. The message, or page order, is issued by MTSO 33 and transmitted as mobile station control message 72 (FIG. 2) over forward control channel 58 (FIG. 2). The page order contains MIN 74 and, as discussed above, MIN 74 need not be a unique number.

Upon transmission of a page order, a query task 134 then monitors for a paging order confirmation message 78 (FIG. 2). If no paging order confirmation messages 78 are detected, a task 144 initiates a setup failure process. Task 144 takes the appropriate action to inform PSAP 55 (FIG. 1) of setup failure. Program control then returns to task 118 (FIG. 3) to monitor for other call-backs directed to cellular radiotelephone 20.

While primary and partner MTSOs 33 perform task 134, cellular radiotelephone 20 monitors busy/idle bits 66 (FIG. 2). When reverse control channel 60 is idle, cellular radiotelephone 20 performs a system access by sending data over reverse control channel 60. The sent data contain MIN 74, ESN 76, and paging order confirmation message 78. Accessing reverse control channel 60 when busy/idle bits 66 are idle reduces the likelihood of two or more cellular radiotelephones that have the same MIN 74 from responding to a page order at the same time. When busy/idle bits 66 are switched to busy outside a predetermined timing window, a cellular radiotelephone conventionally aborts any transmission attempt and waits a random time interval before attempting to access reverse control channel 60 again. In response to an access attempt, busy/idle bits 66 (FIG. 2) of forward control channel 58 are switched to busy in a conventional manner (i.e. within the predetermined timing window), indicating that corresponding reverse control channel 60 is busy. Reverse control channel 60 is released when the access attempt is complete.

When task 134 detects a paging order confirmation message 78 from the access attempt, the data transmitted on reverse control channel 60 is processed in a task 136, to determine if the conveyed ESN 76 matches ESN 76 extracted from internal routing table 106 or internal routing table 117.

In query task 138, which is performed after task 136, paging order confirmation message 78 is evaluated to determine if comparison task 136 indicates a match with ESN 76. When transmitted ESN 76 matches the ESN 76 extracted from identity code 107, program control returns to task 140 in process 80 (FIG. 5) to process the call. The call is processed before another cellular radiotelephone accesses the system, and all subsequent access attempts are ignored. Referring briefly to FIG. 5, task 140 allocates a voice channel for cellular radiotelephone 20 (FIG. 1) and performs other conventional call set-up functions. If call set-up is successful, task 140 then performs conventional call management functions. When cellular radiotelephone 20 is answered in response to the call, the voice channel is then enabled (i.e. connected through to PSAP 55). This causes the call-back call between cellular radiotelephone 20 and PSAP 55 to progress in a conventional manner until the call terminates. When call-back succeeds through one MTSO 33, PSTN 36 drops the call to the other MTSO 33. Eventually program control returns to task 86, discussed above.

When transmitted ESN 76 does not match the ESN 76 extracted from identity code 107, a query task 142 (FIG. 7)

determines if there are other paging order confirmation messages 78. Paging confirmation message 78, conveying MIN 74, may be received from cellular radiotelephone 20, which has initiated an access delay until busy/idle bits 66 are switched to idle. Additional paging order confirmation messages 78 may be the result of an emergency call originating from cellular radiotelephone 20 with a non-unique MIN 74 (i.e. inactive). In other words, multiple cellular radiotelephones may respond to the page order transmitted in task 132.

When there is another paging order confirmation message 78, program control loops back to task 136 to compare ESNs 76. This process is repeated for a plurality of paging order confirmation messages 78 in response to the page order. Task 136 and subsequent tasks repeat until paging order confirmation message 78 conveys a matching ESN 76, or until there are no further paging order confirmation messages 78 conveying MIN 74.

When there are no further page order confirmation messages and a matching ESN 76 was not found, task 144 initiates a setup failure process.

In summary, the present invention provides an improved emergency call-back process. The call-back process allows a return call to be performed over both A-side and B-side cellular systems concurrently. This allows for a greater probability in making a successful connection between an emergency caller and PSAP in the event of a call-back. This is especially desirable in the situation where the emergency call originates from an unauthorized cellular radiotelephone or from an unauthorized roamer. This call-back process can be implemented by cellular carriers at fairly nominal cost since this process is software based and resides in MTSO intelligence. No changes to the general population of existing cellular radiotelephones are required.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of operating a mobile telephone switching office (MTSO) to provide call-back to a cellular radiotelephone following an emergency call, said method comprising the steps of:

(a) detecting an emergency call from a cellular radiotelephone;

(b) obtaining an identity code for said radiotelephone, said identity code being comprised of a radiotelephone MIN and a radiotelephone Electronic Serial Number (ESN);

(c) assigning said cellular radiotelephone a substitute mobile identification number (MIN);

(d) storing said identity code in association with said substitute MIN;

(e) enabling said call from said radiotelephone to a Public Safety Answering Position (PSAP);

(f) detecting a return call to said substitute MIN;

(g) extracting said radiotelephone MIN from said identity code;

(h) transmitting a paging message addressed to said radiotelephone MIN;

(i) receiving a plurality of paging confirmation messages in response to said transmitting step, each of said plurality of paging confirmation messages conveying said radiotelephone MIN; and (j) determining whether one of said plurality of paging confirmation messages conveys said radiotelephone ESN.

2. A method as claimed in claim 1 wherein said steps (b), (c), (d), (g), (h), (i), and (j) are performed for all emergency calls.

3. A method as claimed in claim 1 wherein said substitute MIN is a local MIN relative to said MTSO.

4. A method as claimed in claim 1 wherein:
    said step (a) occurs at one of an A-side cellular system and a B-side cellular system;
    said step (c) comprises the step of selecting said substitute MIN from a list of substitute MINs; and
    said list of substitute MINs is accessible by said A-side and B-side systems.

5. A method as claimed in claim 4 additionally comprising the step of defining said list of substitute MINs so that said return call is routed by a central office to each of said A-side and B-side cellular systems.

6. A method as claimed in claim 1 wherein said step (e) comprises the step of setting up said emergency call from said MTSO to said PSAP so that said PSAP is informed that said emergency call originates from said substitute MIN.

7. A method as claimed in claim 1 wherein said steps (b), (c), (d), (g), (h), (i), and (j) are performed for unauthorized radiotelephones.

8. A method of operating a mobile telephone switching office (MTSO) for a first one of an A-side cellular system and a B-side cellular system to provide call-back to a cellular radiotelephone following an emergency call, said method comprising the steps of:

(a) detecting an emergency call initiated by said cellular radiotelephone;

(b) obtaining an identity code for said cellular radiotelephone;

(c) assigning said cellular radiotelephone a substitute mobile identification number (MIN) from a list of substitute MINs accessible by said A-side and B-side cellular systems;

(d) storing said identity code in association with said substitute MIN from said MTSO;

(e) enabling said call from said radiotelephone to a Public Safety Answering Position (PSAP);

(f) detecting a return call directed to said substitute MIN; and (g) paging, in response to said step (f), said radiotelephone assigned said substitute MIN.

9. A method as claimed in claim 8 additionally comprising the step of defining said list of substitute MINs so that said return call is routed by a central office to each of said A-side and B-side cellular systems.

10. A method as claimed in claim 8 wherein:
    said identity code is comprised of a radiotelephone MIN and a radiotelephone Electronic Serial Number (ESN); and
    said step (g) comprises the steps of extracting said radiotelephone MIN and transmitting a message addressed to said radiotelephone MIN.

11. A method as claimed in claim 10 additionally comprising the steps of:
    receiving a plurality of paging confirmation messages in response to said transmitting step, each of said plurality of paging confirmation messages conveying said radiotelephone MIN; and
    determining whether one of said plurality of paging confirmation messages conveys said radiotelephone ESN.

12. A method as claimed in claim 8 wherein said step (e) comprises the step of setting up said emergency call from said MTSO to said PSAP so that said PSAP is informed that said emergency call originates from said substitute MIN.

13. A method of operating cellular radio telecommunication network having an A-side cellular system mobile telephone switching office (MTSO) and a B-side cellular system MTSO to provide call-back on each of said A-side and B-side cellular systems to a cellular radiotelephone following an emergency call, said method comprising the steps of:

(a) detecting an emergency call at a first one of said A-side and a B-side MTSOs from said cellular radiotelephone;

(b) obtaining, at said first MTSO, an identity code for said cellular radiotelephone;

(c) assigning a substitute mobile identification number (MIN) from a list of substitute MINs, said list being accessible to said A-side and B-side MTSOs;

(d) communicating said identity code and said substitute MIN to a second one of said A-side and B-side MTSOs;

(e) storing said identity code in association with said substitute MIN at each of said A-side and B-side MTSOs;

(f) enabling said call from said radiotelephone to a Public Safety Answering Position (PSAP) through said first MTSO;

(g) detecting a return call directed to said substitute MIN at each of said A-side and B-side MTSOs; and (h) paging from each of said A-side and B-side MTSOs, in response to said step (g), said radiotelephone assigned said substitute MIN by transmitting a page order directed to said identity code.

14. A method as claimed in claim 13 additionally comprising the step of defining said list of substitute MINs so that said return call is routed concurrently by a central office to each of said A-side and B-side MTSOs.

15. A method as claimed in claim 13 wherein:

said identity code has a radiotelephone MIN and a radiotelephone Electronic Serial Number (ESN);

said step (h) comprises the steps of extracting said radiotelephone MIN and transmitting a message addressed to said radiotelephone MIN;

said method additionally comprises the step of receiving a plurality of paging confirmation messages in response to said transmitting step, each of said plurality of paging confirmation messages conveying said radiotelephone MIN; and said method additionally comprising the step of determining whether one of said plurality of paging confirmation messages conveys said radiotelephone ESN.

16. A method as claimed in claim 13 wherein said step (h) occurs substantially concurrently at each of said A-side and B-side MTSOs.

* * * * *